United States Patent [19]
Grube

[11] 4,244,104
[45] * Jan. 13, 1981

[54] MULTIPLE USE CHAIN SAW MILL

[76] Inventor: George Grube, 14135 Olde Highway 80, El Cajon, Calif. 92021

[ * ] Notice: The portion of the term of this patent subsequent to Jan. 16, 1996, has been disclaimed.

[21] Appl. No.: 943,282

[22] Filed: Sep. 18, 1978

Related U.S. Application Data

[63] Continuation of Ser. No. 854,270, Nov. 23, 1977, Pat. No. 4,134,203.

[51] Int. Cl.³ .............................................. B27B 17/02
[52] U.S. Cl. ........................................ 30/371; 30/381; 83/574; 83/745; 83/794
[58] Field of Search .......................... 83/745, 794, 574; 30/371, 372, 373, 383

[56] References Cited
U.S. PATENT DOCUMENTS

| | | | |
|---|---|---|---|
| 3,225,799 | 12/1965 | Hayden et al. | 30/371 |
| 3,864,830 | 2/1975 | Haddon | 30/371 |
| 3,926,086 | 12/1975 | Crane | 83/745 |
| 4,070,757 | 1/1978 | Granberg et al. | 30/371 |

Primary Examiner—Donald R. Schran
Attorney, Agent, or Firm—Harris Zimmerman; Howard Cohen

[57] ABSTRACT

A mill for guiding the cutting of a chain saw includes a mill frame comprising a pair of longitudinally spaced, parallel members joined by a plurality of rod-like runners extending orthogonally therebetween and joined to the lower surfaces thereof. A chain saw bar may be secured subjacent to the mill frame and selectively spaced therefrom by a pair of bolts extending through the chain saw bar to the mill frame, and a plurality of tubular spacer members secured on each bolt between the bar and the mill frame. The runners of the mill frame ride on a plank secured on a log or on a previously cut surface to guide the chain saw in making planar, longitudinal cuts through a log. A slider assembly is also provided, clamped to the longitudinal members of the mill frame, and adapted to secure the chain saw in spaced relation therefrom with the chain saw bar extending downwardly therefrom. The slider assembly engages a previously cut edge of a log or lumber piece and acts as a rip fence to guide the cutting action of the chain saw.

7 Claims, 11 Drawing Figures

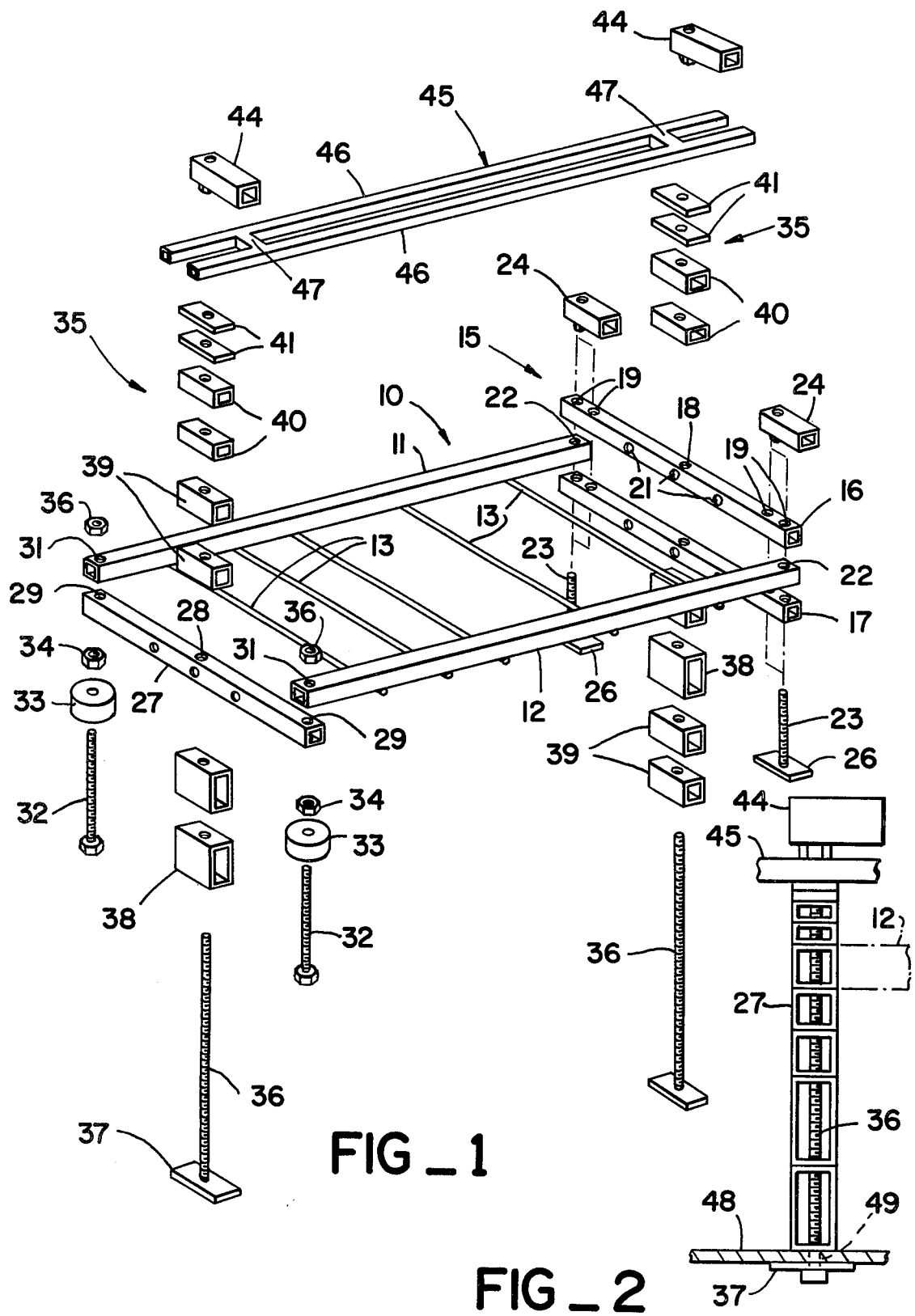
FIG_1
FIG_2

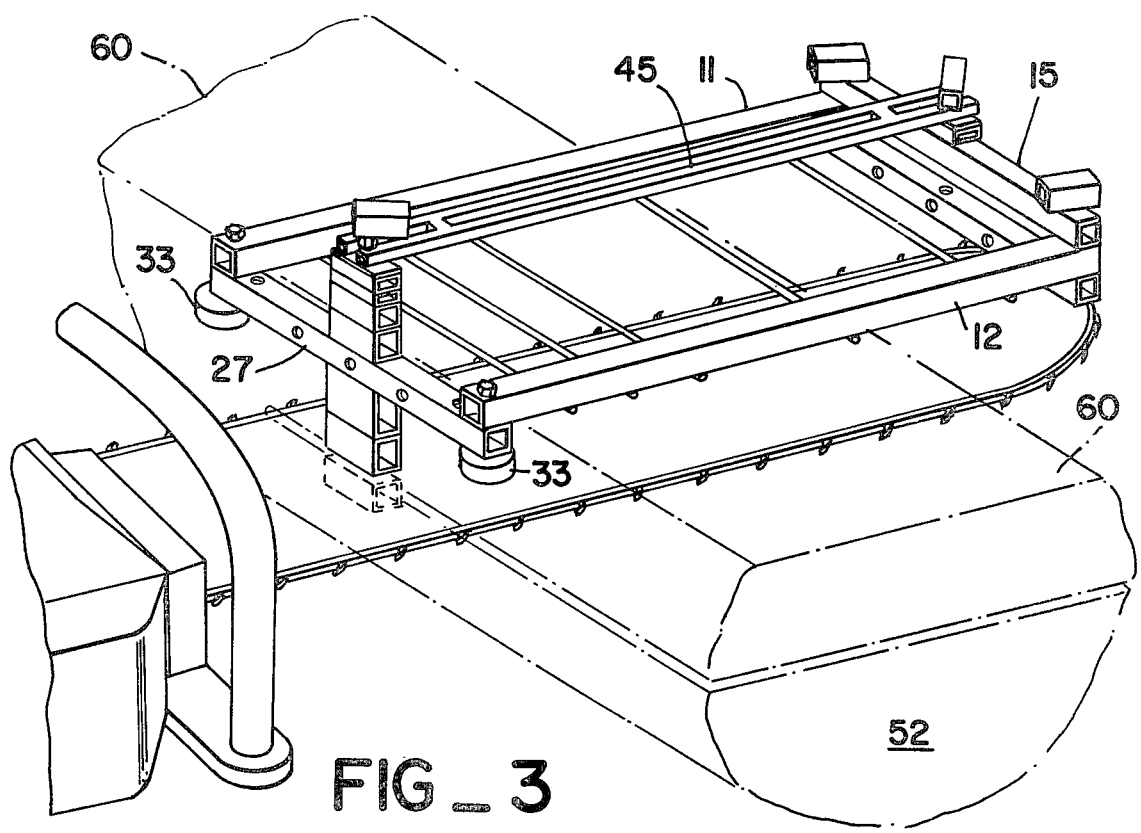
FIG_3
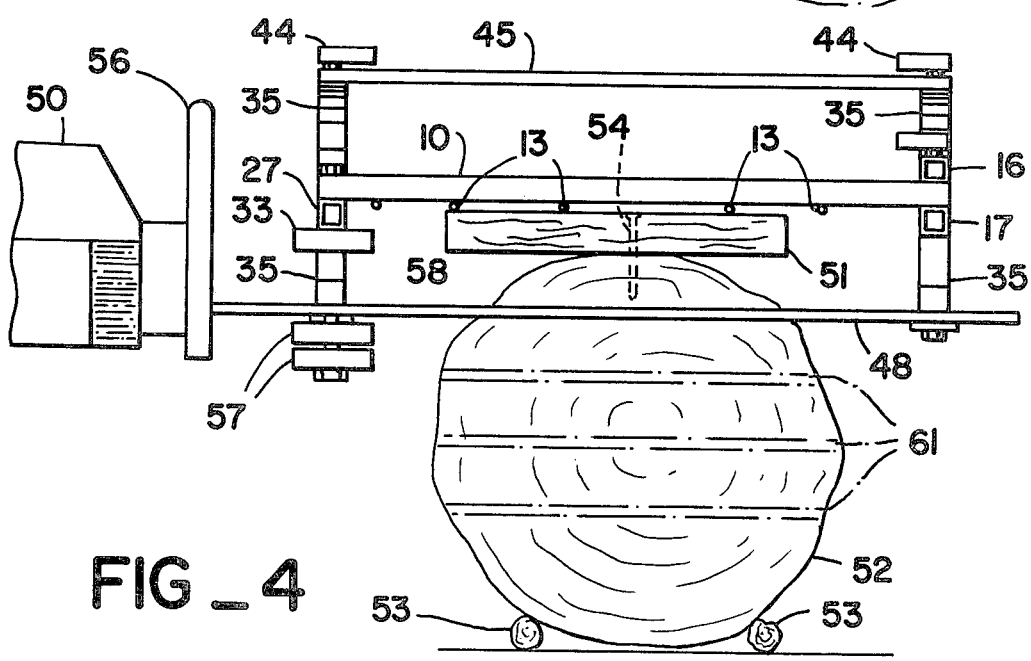
FIG_4

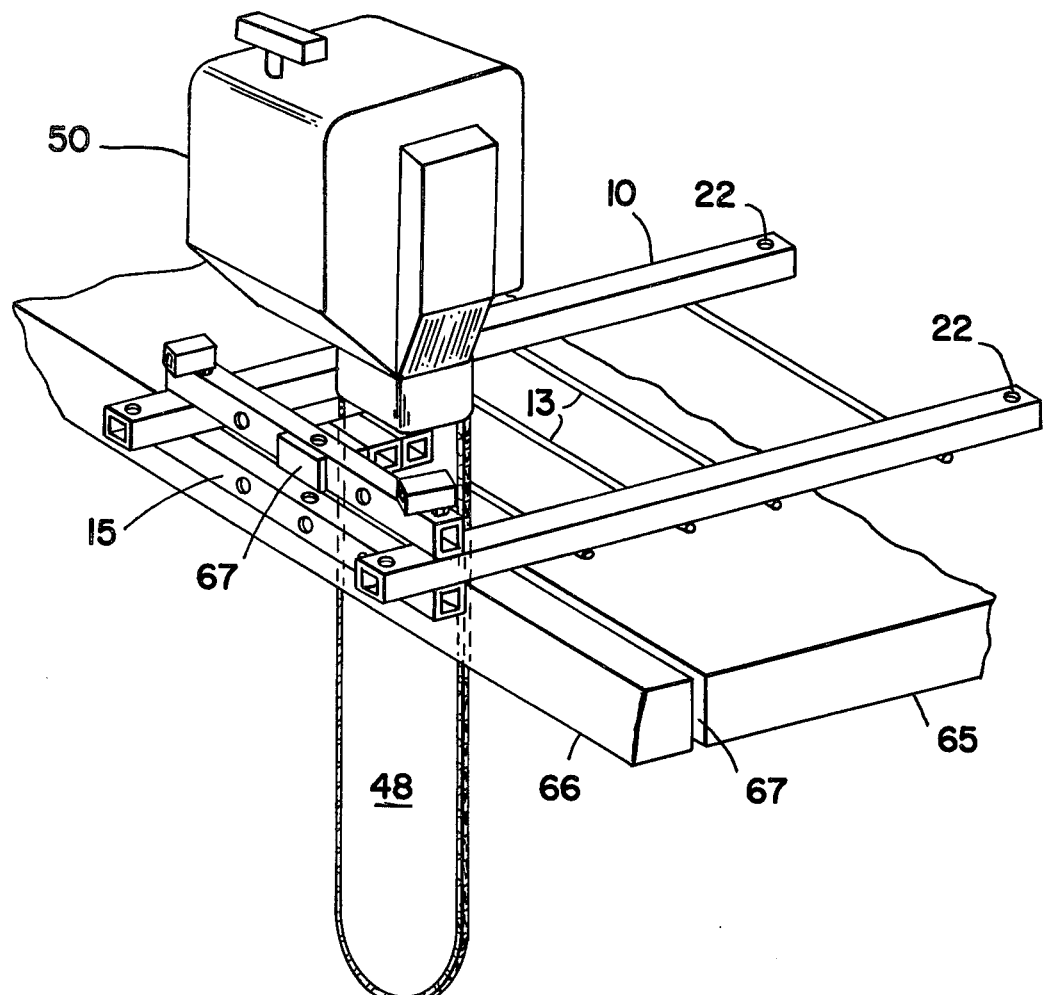
FIG_5
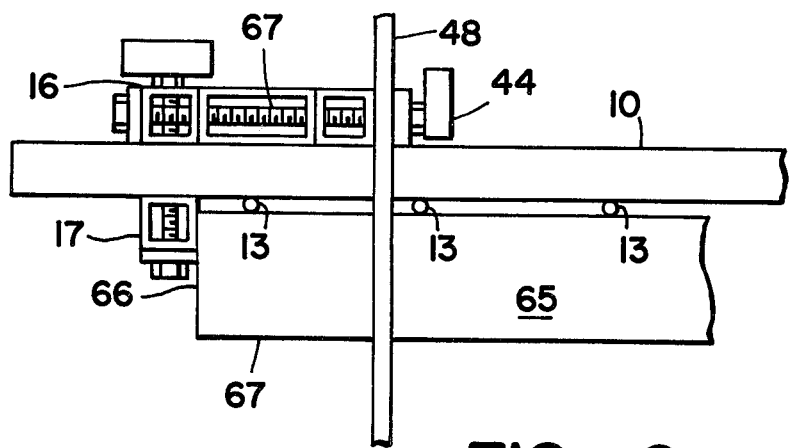
FIG_6

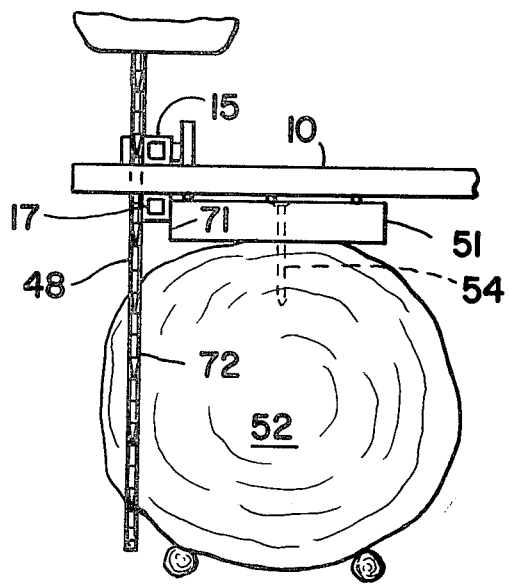
FIG_7
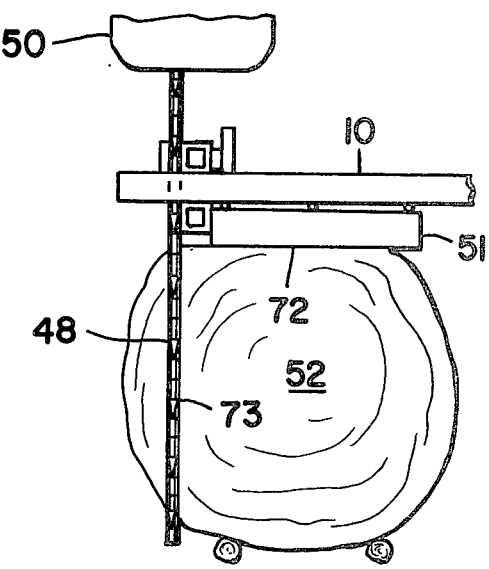
FIG_8
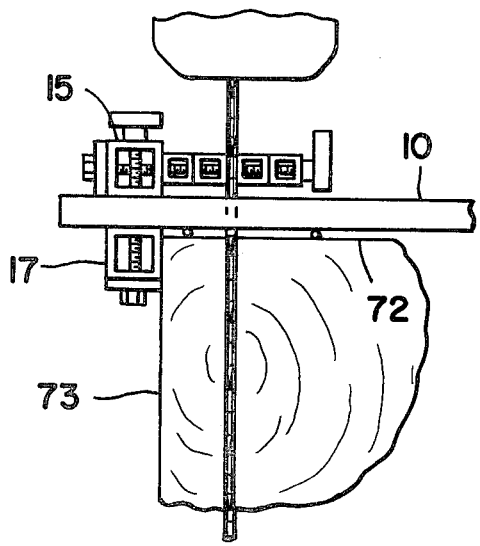
FIG_9
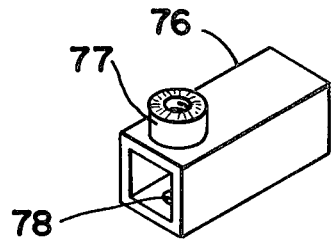
FIG_10
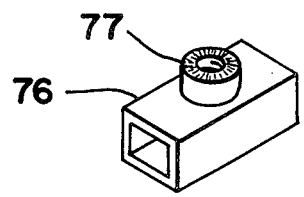
FIG_11

MULTIPLE USE CHAIN SAW MILL

REFERENCE TO PRIOR APPLICATION

This application is a continuation of application Ser. No. 854,270, filed on Nov. 23, 1977, entitled Multiple Use Chain Saw Mill, now U.S. Pat. No. 4,134,203.

BACKGROUND OF THE INVENTION

The following patents represent the most pertinent prior art relating to the present invention.
U.S. Pat. No. 3,051,203
U.S. Pat. No. 3,092,156
U.S. Pat. No. 3,134,409
U.S. Pat. No. 3,225,799
U.S. Pat. No. 3,956,788

In general, chain saw mills are used to guide the cutting action of a chain saw so that the resulting slabs and lumber pieces have surfaces which are as smooth and parallel as possible. Generally speaking, chain saw mills are used to guide the chain saw bar in a horizontal disposition to make longitudinal cuts through a log, or to maintain the chain saw bar in a vertical disposition to make longitudinal cuts through either a log or a previously cut piece.

One chain saw mill known in the prior art employs a mill frame and a pair of screw jacks extending therefrom to secure the chain saw bar in a horizontal disposition with respect to a previously cut log surface on which the mill frame rests. The mill frame includes a plurality of rollers which allow the frame to translate along the previously cut surface as the chain saw cuts through the wood below.

This form of chain saw mill has been found to be deficient in several important respects. The rollers which purportedly provide easy translation of the mill frame tend to plow into the sawdust which naturally accumulates on the upper surface. When the accumulation becomes too great, the rollers ride up over the sawdust, carrying with them the chain saw bar and causing it to deviate from a planar cutting path through the log. Also, the screw jacks which adjustably support the chain saw bar are subject to rapid corrosion from the wet, acidic sawdust generated by the cutting procedure, as well as from the natural elements which must be accommodated in outdoor cutting procedures. Furthermore, it has been found that when one screw jack is extended a certain amount more than the other, the threaded bores which receive the screw jacks become misaligned therewith, and the screw jacks bind in the bores. It is often quite difficult and time consuming to free the screw jacks and return to normal cutting procedures.

Chain saw mills which support the chain saw bar in a generally vertical disposition while longitudinal cuts are made are quite distinct from the horizontally disposed chain saw mills. These devices generally bolt or clamp to the chain saw bar, and include a carriage which rides on a guide rail or guide track which is secured to the wood being cut. Such devices are extremely laborious and tedious to use, since the guide rail or track must be re-set prior to the initiation of a subsequent cut. The chain saw bar may be spaced in increasing increments from a fixed guide track or rail, one increment for each subsequent cut, but this system results in increasingly less control of the chain saw bar as it is displaced farther from the guiding track.

Most importantly, in the cutting of logs into useful lumber by means of a chain saw, it is necessary to use both forms of chain saw mill; that is, the log is often cut horizontally into slabs, and the slabs are then cut with a vertically disposed chain saw into useful lumber pieces. These two separate cutting procedures necessitate using two different forms of chain saw mill, thus doubling the initial expense, and maintenance expenses for the tools.

SUMMARY OF THE PRESENT INVENTION

The present invention generally comprises a chain saw mill which is more durable, and cheaper than prior art chain saw mills, and which provides smoother, more uniform chain saw cuts. Most importantly, the chain saw mill of the present invention is adapted to guide the chain saw bar in both the horizontal and vertical cutting positions. Thus, the present invention provides one device which accomplishes the same tasks as at least two chain saw mill devices known in the prior art.

The present invention includes a mill frame which is composed of a pair of longitudinally extending rectangular tubular members which are disposed in parallel, spaced apart relationship. Extending orthogonally between the longitudinal members and secured to the undersides thereof are a plurality of rod-like runner members. Secured to like ends of the pair of longitudinal members are a pair of thrust rollers which depend subjacently from the mill frame. A cross-member which is disposed parallel to the runner members is also secured to the like ends of the longitudinal members by the same bolts which secure the thrust rollers in place.

The invention also includes a slider assembly which is clamped to the mill frame and adjustably disposed thereon. The slider assembly includes a pair of rectangular tubular members extending generally parallel to the runner members and disposed above and below the mill frame. The tubular members are joined by bolts and speed nuts extending therebetween to create a clamping action on the mill frame. Further, the rectangular members are provided with holes in the distal ends thereof which may be aligned with similar holes in the mill frame so that the slider assembly may be fixedly bolted to the end of the mill frame opposite the end securing the thrust rollers.

To secure the chain saw bar in the horizontal disposition, a pair of long bolts are secured through holes in opposed ends of the chain saw bar and through the slider assembly and the end member of the mill frame. The chain saw bar is positively spaced from the mill frame by means of a plurality of spacer members secured on the long bolts. The spacer members are provided in various sizes and numbers so that any desired spacing between the mill frame and the chain saw bar may be easily obtained. The long bolts extend upwardly through the mill frame, and the unused spacers are stored on these portions of the bolts. A longitudinally extending connecting member extends between the upper ends of the bolts, and a speed nut is secured tightly to the upper distal end of each bolt to secure the chain saw bar, stack of spacers, mill frame, and unused spacers in a compressed, rigid assembly.

When it is desired that vertical cuts be made, such as for cutting planks or pieces of lumber, the slider assembly is unbolted from the mill frame and instead clamped thereto by bolts and speed nuts. The chain saw bar is then secured to the slider assembly by means of a bolt extending through the slider assembly, through any selected plurality of spacers, and through a hole in the chain saw bar near the power head thereof. The chain saw bar extends downwardly from the mill frame, through any gap between any two adjacent runner members. In this configuration, the lower tubular member of the slider assembly rides on a previously cut edge, while the spacers separating the slider assembly from the chain saw bar determine the width of the cut being made vertically and longitudinally through the wood. The mill frame is still disposed horizontally on the wood, providing a stable base for the support of the chain saw. It should be noted that the same spacers, bolts, and speed nuts may be used for both the horizontal and vertical cutting configurations.

A BRIEF DESCRIPTION OF THE DRAWINGS

FIG. 1 is an exploded view of the chain saw mill of the present invention.

FIG. 2 is a cross-sectional elevation of a portion of the mill frame of the present invention, assembled with a chain saw bar and spacers.

FIG. 3 is a perspective view of the chain saw mill of the present invention, shown supporting a chain saw bar in horizontal disposition.

FIG. 4 is a log end view of the present invention as shown in FIG. 3.

FIG. 5 is a perspective view of the chain saw mill of the present invention, supporting a chain saw bar in vertical cutting disposition.

FIG. 6 is an end view of the present invention as shown in the disposition of FIG. 5.

FIG. 7 is an end view showing the present invention used for making vertical cuts in a log.

FIG. 8 is an end view as in FIG. 7, showing the next step in the log cutting process.

FIG. 9 is an end view as in FIGS. 7 and 8, showing the next step in the log cutting process.

FIG. 10 is a perspective view of a speed fastener of the present invention.

FIG. 11 is a perspective view of a further embodiment of the speed fastener of the present invention.

DESCRIPTION OF THE PREFERRED EMBODIMENT

With reference to FIG. 1, the chain saw mill of the present invention includes a mill frame 10 which is formed of a pair of parallel, spaced apart tubular members 11 and 12. The tubular members are rectangular in cross-sectional configuration, and are joined by a plurality of runner members 13 extending orthogonally between the tutublar members 11 and 12 and secured by welding to the undersides thereof. Three of the runner members are in generally close spaced relationship, and all of the runner members have rounded or bevelled ends. The significance of these features will be noted in the following functional description.

The present invention also includes a slider assembly 15, which is composed of a pair of rectangular tubular members 16 and 17 disposed generally orthogonally to the longitudinal members 11 and 12, and spaced above and below the mill frame. Each member 16 and 17 includes a pair of vertical holes 19 extending therethrough adjacent to each end thereof. The members are also provided with a vertical hole 18 extending through the center portion thereof, and a trio of spaced holes 21 extending laterally through each member 16 and 17. It may be appreciated, with reference to FIG. 1, that members 16 and 17 are identical and interchangeable.

The slider assembly 15 is secured to the mill frame 10 by means of bolts 23 which are provided with oversized rectangular heads 26. The bolts 23 may be secured through the outermost of the pairs of holes 19, and through aligned vertical holes 22 in like ends of the tubular members 11 and 12. The threaded ends of the bolts are secured by speed fasteners 24 and a slider assembly 15 is thus tightly bolted to one end of the mill frame.

Alternatively, the bolt 23 may be secured through the inner ones of the pairs of holes 19 in the tubular members 16 and 17. These inner holes are spaced slightly inwardly from the tubular members 11 and 12 of the mill frame, so that the bolts 23 extend through the gap defined between the members 11 and 12. The speed fasteners 24 secure the bolts 23 and compress the members 16 and 17 together to form a clamping action which secures the slider assembly 15 to the mill frame 10. In this clamping configuration, the slider assembly may be secured to any portion of the mill frame, except those small portions occupied by the runner members 13.

Secured to the other end of the mill frame 10 is an end member 27, which comprises a rectangular tubular member having a vertically disposed hole 29 extending through each end thereof. The holes 29 are aligned with vertical holes 31 extending through the other like ends of the members 11 and 12. Joining the member 27 to the end of the mill frame 10 is an assembly comprising a bolt 32, a thrust roller 33, a lock nut 34, and a retaining nut 36. The bolt 32 extends through the aligned holes 29 and 31, and the compression exerted by the nuts 34 and 36 secures the end member 27 to the mill frame and also provides axial clearance between the nut 34 and the head of the bolt 32 so that the thrust rollers 33 may rotate freely.

In an alternative embodiment of the present invention, the end member 27 may be formed to be identical to either of the members 16 or 17 of the slider assembly. Thus all of the members 16, 17, and 27 would be interchangeable and interchange of the parts may be made whenever any one of them shows undue wear. Furthermore, the manufacturing of the present invention is simplified by the reduction in dissimilar components.

A most salient feature of the present invention is the provision of spacer assemblies 35 which secure the chain saw bar to the mill, in selectively varied spaced relationship, in either a horizontal or vertical disposition. Each spacer assembly 35 includes a long spring-steel bolt 36 which is provided with SAE fine thread and an enlarged rectangular head 37. The spacer assembly also includes a plurality of spacer members 38, 39, 40, and 41 having spacing heights of two inches, one inch, one-half inch, and one-quarter inch respectively. The spacer members 38-40 are formed of short lengths of rectangular tubular stock, each with the hole drilled therethrough for receiving the bolt 36. The spacers 41 are formed of sheet metal stock, and are similar in length and width to the other spacer members. Joined to the upper end of the bolt 36 is a speed fastener 44, which is identical to the speed fasteners 24.

Joining the upper ends of the bolts 36 is a connecting member 45. The connecting member 45 is composed of a pair of parallel, narrow tubular members 46 assembled to a pair of intermediate spacer members 47 secured between opposed, distal portions of the members 46. The slot thus formed between the members 46 is adapted to receive the distal threaded portions of the bolt 36, with the speed fasteners 44 securing the member 45 to the spacer assemblies 35 and rigidifying the entire structure.

The use and flexibility of the spacer assemblies 35 is best described with reference to FIG. 2. The chain saw bar 48 is provided with a hole 49 extending through each distal end portion of the chain saw bar. The bolt 36 is secured through the hole 49, with the enlarged head 37 impinging on the chain saw bar 48. A plurality of spacers 38–41 are assembled onto the bolt 36 to create the desired spacing between the chain saw bar 38 and either of the members 27 or 17 through which the bolts 36 extend. Since the members 27 and 17 abut the lower surface of the mill frame 10, the height of the spacers together with the height of the members 17 and 27 determine the spacing between the chain saw bar and the mill frame 10. This spacing is identical for both assemblies 35.

It may be appreciated that one of the bolts 36 passes through the medial hole 28 in the member 27, and that the spacers of that spacer assembly 35 which are not disposed below the member 27 may be secured to the bolt 36 above the member 27. The other bolt 36 extends through the aligned holes 18 in both the members 17 and 16, and the unused spacers of that assembly may be secured to the bolt 36 above the member 16.

The spacer members may be interchanged between assemblies 35 so that the spacing of the chain saw bar 48 is parallel to the mill frame 10, and the height of the assemblies 35 above the mill frame 10 is identical. The connector member 45 is then secured to the upper distal portions of the bolts 36, and the speed fasteners 44 are tightened thereto to compress each assembly 35. When the assemblies are thus compressed, they form a rigid column. The rigidity of this column is due to the confronting, planar, parallel faces of the spacer members. This rigid structure secures each end of the chain saw bar 48 to a respective end of the mill frame 10. The chain saw bar and the mill frame are thus rigidly secured together in spaced apart, parallel relationship.

It should be noted that each spacer assembly 35 may be easily disassembled, and the position of the spacers above and below the members 27 or 17 modified to provide the desired spacing between the chain saw bar 48 and the mill frame 10. This variable spacing assembly involves no moving parts; rather, the parts are all easily interchangeable, yet are rigidly fixed in the assembly when it is tightened together.

It should be noted that the foregoing description of the nature and use of the spacer assemblies 35 is applicable whether the slider assembly 15 is bolted through the hole 22 or is clamped to any portion of the mill frame 10. Thus, the length of the members 11 and 12 of the mill frame may be selected, for manufacturing pruposes, to match the most common size or sizes of chain saw bar. Yet the slider assembly 15 may be positioned anywhere along the mill frame 10 to accommodate any length of chain saw bar less than the entire length of the mill frame 10.

With the chain saw bar secured by the spacer assemblies 35 in a spaced, parallel relationship to the mill frame 10, the entire assembly may be used to make a series of horizontally extending, longitudinal cuts in a log 52, as shown in FIG. 4. The log is braced on a floor or ground surface by chocks 53, and a plank 51 is secured to the upper surface of the log by means of spikes 54. The mill frame 10 is disposed on one end of the plank 51, with at least two of the runner members 13 supporting the weight of the mill frame and chain saw assembly on the upper surface of the plank 51. The chain saw motor 50 is then started, and the initial cut is started at the end of the log. The entire assembly may be controlled by the chain saw operator grasping the handle 56 of the chain saw with one hand and the connecting member 45 of the chain saw mill with the other hand. The runner members 13 maintain the chain saw bar 48 in exact parallel relationship with the upper surface of the plank 51, guiding the chain saw to make a smooth, planar cut longitudinally through the log.

It should be noted that the thrust rollers 33 are disposed generally adjacent to a side surface of the plank 51. Since the cutting chain often exerts a longitudinal force on the chain saw bar which urges the motor 50 toward the log 52, the impingement of the rollers 33 on the side of the plank 51 limits this longitudinal motion and frees the chain saw operator from the need to exert any physical force to resist this motion.

To augment this resistance to longitudinal chain saw motion, the mill frame of the present invention may be provided with additional thrust rollers 57 which are secured to the lower end of the bolt 36 which extends through the end of the chain saw bar adjacent to the motor 50. The rollers 57 are disposed between the chain saw bar 48 and the head of the bolt 37. The additional thrust rollers 57 impinge on log contours which might entirely miss the thrust rollers 33, and provide added protection against the possibility of the chain saw being drawn longitudinally too far into the log.

After the first longitudinal cut has been made with the aid of the plank 51, the plank and the first cut slab 58 are removed, and the configuration of the spacer assemblies 35 may be modified to select the thickness of the slabs cut subsequently. The cutting procedure is then begun once more, with the runner members 13 resting on the previously cut surface 60 of the log 52. Due to the fact that the length of the runner members 13 is substantially greater than the width of the chain saw bar 48, it is easy for the chain saw operator to align the chain saw bar horizontally as each new cut is initiated. Subsequent cuts 61 in the log 52 may be made, with the thickness of the resulting slabs of wood being determined by the configuration of the spacer assemblies, as explained in the foregoing. The slabs that result from this cutting process may then be dried and finished to form tables, shelves, planking, wall hangings, or the like. Alternatively, the slabs of wood may be cut into lumber size pieces as will be explained in the following. To cut the slabs of wood into lumber, the configuration of the chain saw mill of the present invention is altered to that shown in FIGS. 5 and 6. The slider assembly 15 is clamped to the mill frame 10, and is disposed at any convenient point along the frame which permits a sufficient number of runner members 13 to rest on the upper planar surface of the slab 65. The chain saw bar 48 is disposed vertically, depending from the power head 50. It is secured in this disposition by a bolt 67 extending through one of the lateral holes 21 in the upper member 16 of the slider assembly, as shown also in FIG. 6. The bolts 67, which may comprise any of the bolts 36 or 32 as described in the foregoing, extend through one or more spacer members 38, 39, 40, or 41, to separate the chain saw bar 48 by a selected spacing interval from the slider assembly 15. A speed fastener 44 secures the distal threaded end of the bolt 67, and compresses the chain saw bar, spacers, and the members 16 together to form a rigid assembly which sup- ports the chain saw with the bar in the vertical disposition. Further, it should be noted that the plane of the chain saw bar 48 is parallel to the members 16 and 17, due to the rectangular configurations of the spacers.

In the cutting procedure shown in FIGS. 5 and 6, the lower member 17 of the slider assembly 15 impinges on the smooth, planar side surface 66 which has been previously cut by the chain saw using the same assembly configuration with the chain saw mill. The bar 48 is maintained in the vertical configuration, with the runners 13 supporting the entire assembly on the upper planar surface of the slab 55. The impingement of the member 17 on the side surface 66 guides the chain saw bar 48 to make a vertical, longitudinally extending cut 67 through the slab which is exactly parallel to the surface 66. This procedure may be reiterated, using any selected spacing interval between the chain saw bar and the slider assembly, to cut lumber pieces or planks of any desired width.

It should be noted that the initial outer edge surface of the slab 65, which constitutes a portion of the circumferential outer surface of the log, may have many irregular contours. An initial planar, vertical cut may be formed in such a slab by the use of a plank having at least one straight edge. The plank may be nailed or spiked to the slab 65, with the straight edge of the plank adjacent to the irregular edge of the slab. The plank may then be used as a guide, the member 17 of the slider assembly impinging on and sliding along the straight edge of the plank to form the initial straight cut in the slab 65. Once this is done, the plank may be removed and the previously cut surface may be used as a guide for the next cut.

With reference to FIGS. 1 and 5, it will be noted that three spaced holes 21 are provided for securing the chain saw bar 48 in the vertical disposition for vertical cutting. The outer ones of the holes 21 are provided for securing the chain saw bar so that the power head 50 rests on one of the members 11 or 12 of the mill frame, with the longitudinal axis of the chain saw bar inclined from vertical. This configuration prevents the chain from contacting and damaging the members 11 or 12, and also permits the sawdust generated by the cutting chain to be thrown downwardly away from the chain saw operator. In either case, the chain saw bar is still disposed in a vertical plane.

With the chain saw and the chain saw mill assembled in the configuration of FIGS. 5 and 6, the device may be used to cut a log into planks of any desired thickness. As shown in FIG. 7, a plank 51 is secured to the top surface of the log 52 by means of spikes 54. The chain saw mill is set for vertical cutting, with the chain saw bar 48 spaced slightly outside of the slider assembly 15. The mill and chain saw assembly is supported on the upper planar surface of the plank 51 by the runner members 13, with the member 17 of the slider assembly impinging on the planar side surface 71 of the plank. The chain saw mill frame assembly is translated along the plank, cutting a smooth planar surface 72 longitudinally through the log 52.

The next step in the cutting procedure, shown in FIG. 8, involves rotating the log 52 approximately 90° so that the planar cut surface 72 is facing upwardly. The plank 51 is removed from its initial position, and is resecured to the log atop the surface 72. With the chain saw and mill frame assembled in the same configuration, the cutting procedure of FIG. 7 is reiterated to form a second planar cut surface 73 extending longitudinally through the log 52, and forming a perpendicular angle with the cut surface 72.

For the subsequent steps in the cutting procedure, as shown in FIG. 9, the plank 51 is removed from the log 52. The configuration of the chain saw and mill frame assembly is altered so that the chain saw bar is spaced inwardly from the slider assembly 15, and that spacing interval is selected by the appropriate spacer members. The mill frame 10 is disposed on the cut surface 72, supported on the runner members 13, and the lower member 17 of the slider assembly impinges on the orthogonal cut surface 73. The chain saw and mill assembly is then translated longitudinally along the cut surface 72, guided by the impingement of the member 17 on the surface 73, to make subsequent longitudinal cuts through the log. It should be noted that the chain saw and mill frame assembly need be changed only once during this cutting procedure, and once the cutting procedure has reached the stage of FIG. 9, the cutting procedure may be reiterated with no changes whatsoever. This represents a great improvement in time and labor comsumption over the chain saw mills known in the prior art. Indeed, this advantage also pertains to the cutting procedure shown in FIGS. 5 and 6, and the slab cutting procedure shown in FIGS. 3 and 4.

The speed fasteners 24 or 44 or 67 shown in the various configurations of the present invention generally comprise one of two types of speed fasteners shown in FIGS. 10 and 11. Each of the speed fasteners includes a short length 76 or rectangular tube stock which has holes 78 drilled through opposed faces thereof. A lock nut 77 is then joined to one exterior surface of the member 76 by welding, the lock nut being aligned with the holes 78. Further, the hardened steel friction creating surface of the lock nut 77 faces upwardly, as shown in FIGS. 10 and 11, to engage any adjoining surface.

It may be appreciated that the speed fasteners are generally secured to the bolts 36, or 32, or 23, with the frictional surface of the speed nut 77 impinging on a spacer member or a rectangular tubular member of the mill frame. Since the hardened steel frictional surface of the lock nut is much harder than the rectangular tube stock, it always bites into the surface of the tube stock to form a very tight frictional engagement.

Another advantage of the speed fastener of the present invention is that it is much more difficult to lose or misplace a speed fastener than it is to do likewise with a small lock nut 77. Furthermore, if added tightening torque is required, a simple lever such as a heavy duty screw driver, a rod, or the like, may be inserted into the rectangular cavity of the member 76 to provide an added lever arm for tightening purposes. Also, the speed fasteners of the present invention have an added benefit in that the height of the member 76 may be used as a spacer, with the distal threaded end of the bolt extending through the hole 78 before it is engaged by the nut 77. Although the enhanced tightening ability of the assembly is sacrificed in this kind of use, the speed fastener does provide an added spacer capability which may be required in emergency situations.

To summarize the most salient and advantageous features of the present invention, it should be noted that the cutting procedure shown in FIGS. 3 and 4, FIGS. 5 and 6, and FIGS. 7-9, are all accomplished with the same chain saw mill. These cutting procedures include horizontal slab cuts, vertical trim cuts, and vertical lumber cuts. The width of all cuts made by the present invention is determined by the spacer members, which are rugged and durable and interchangeable. The chain saw mill relies on no moving parts to alter the assembly or configuration thereof, and thus is less subject to damage and wear in the field. Furthermore, the use of simple, rugged parts enables the entire assembly to be manufactured inexpensively, and also enables any particular part to be replaced inexpensively.

Most importantly, the chain saw mill of the present invention provides a rugged device which guides a chain saw to produce very smooth, very planar cuts, whether it is used in the field or in a woodworking shop. It combines the functions normally found in at least two separate categories of prior art chain saw mills, and does so at a price which is less than single function chain saw mills now on the market.

I claim:

1. A device for guiding the cutting action of a chain saw which includes a chain saw bar, comprising; a mill frame, said mill frame including a pair of spaced apart, parallel, longitudinally extending members, at least one runner member extending transversely between said longitudinally extending members in the same plane thereof, a pair of end members each secured between like ends of said longitudinally extending members, at least one of said end members being slidably positionable along said longitudinally extending members; and means for securing the chain saw bar to said end members, including means for maintaining a selected spacing interval between said end members and said chain saw bar.

2. The device of claim 1, wherein said at least one runner member extends generally orthogonally therebetween.

3. The device of claim 1, wherein said end members extend generally orthogonally between said longitudinally extending members to define a generally rectangular mill frame.

4. The device of claim 2, wherein said means for securing the chain saw bar to said end member includes a pair of first members, each extending between the chain saw bar and one of said end members.

5. The device of claim 4, wherein said first members extend perpendicularly to the plane defined by said longitudinally extending members.

6. The device of claim 1, further including a connector member extending between said end members.

7. The device of claim 6, wherein said connector member is disposed generally parallel to and spaced apart from said longitudinally extending members.

* * * * *